Dec. 22, 1959   D. E. NICHOLS ET AL   2,918,157
ADJUSTABLE ROTARY STOP MECHANISM
Filed Sept. 13, 1956
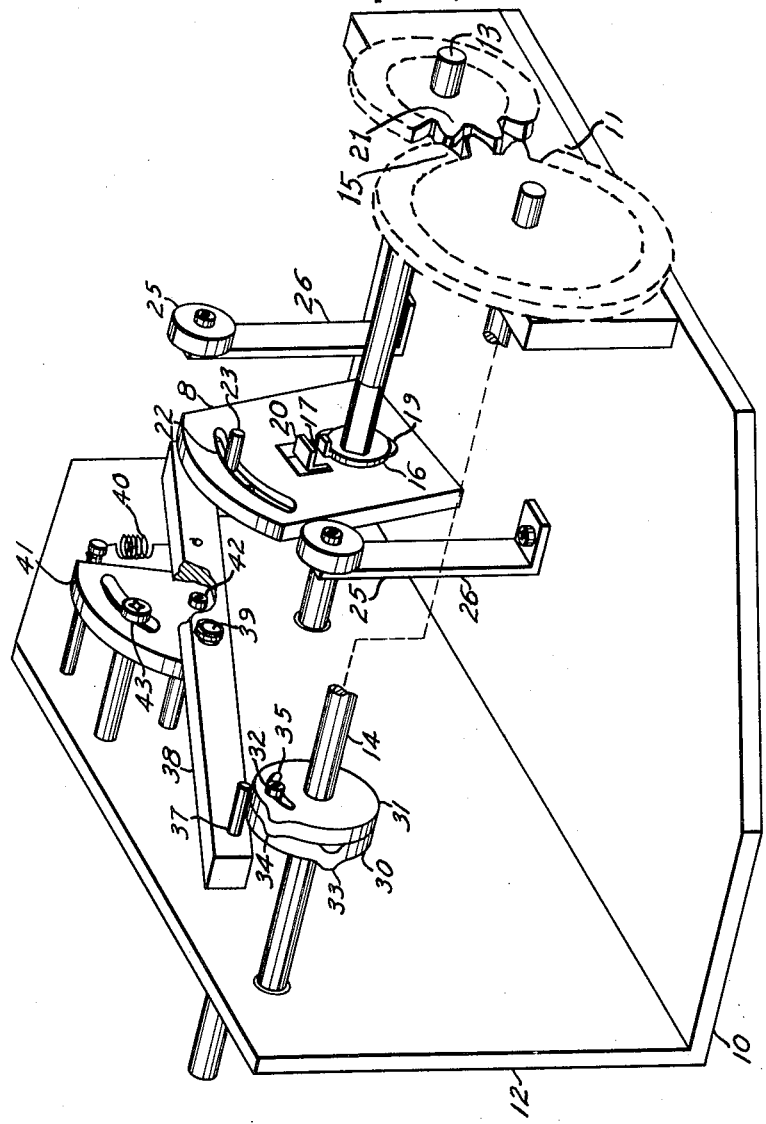
INVENTORS
DONALD E. NICHOLS
BY RAYNOLD A. SWANSON
Moody & Hatcher
ATTORNEYS

United States Patent Office 2,918,157
Patented Dec. 22, 1959

2,918,157

ADJUSTABLE ROTARY STOP MECHANISM

Donald E. Nichols, Seattle, Wash., and Raynold A. Swanson, Cedar Rapids, Iowa, assignors to Collins Radio Company, Cedar Rapids, Iowa, a corporation of Iowa Application September 13, 1956, Serial No. 609,689

3 Claims. (Cl. 192—139)

This invention is related to adjustable rotary stop mechanisms and more particularly to those capable of providing end limits to rotation of a shaft over a widely adjustable range.

Prior art methods for providing end limits to the rotation of a shaft over a large number of turns have been ordinarily without the capability of change of the stop adjustment. As a consequence, there has been no device available for resetting stop limits as desired by the user.

Accordingly, it is an object of this invention to provide a multi-turn rotary stop system providing a great range of adjustment.

It is a feature of this invention that a gear-driven cam shaft actuates a stop operating in cooperation with a stop disc on the primary shaft.

Further objects, features, and advantages of the invention will become apparent from the following description and claims when read in conjunction with the drawing in which:

The figure shows an isometric view of the invention.

In the figure a base 10 carries a gear plate 11 and a side plate 12. Mounted by the gear plate 11 and side plate 12 is a primary shaft 13 which extends through both supports. Shaft 13 is supported in bearings for rotation and is restrained from axial motion. Shaft 13 may be the shaft which is desired to have rotary end limits, or it may be coupled to the shaft to be controlled. Also mounted between gear plate 11 and side plate 12 is a cam shaft 14 mounted similarly to that of shaft 13.

A pair of gears 15 and 21 couple cam shaft 14 to primary shaft 13 with a gear ratio desired in accord with the invention. This gear ratio may be in the range from a fractional to a large ratio as will be understood from further study of the invention.

Mounted on the primary shaft 13 is a stop disc 16. Stop disc 16 is keyed or otherwise fixed to the primary shaft to prevent its rotation relative to the primary shaft. On the perimeter of the stop disc is a lug 17 which projects from the perimeter radially with a radial shoulder in each direction of rotation. Loosely mounted on primary shaft 13 is a stop plate 18 having a slot 19 which permits stop plate 18 to slide transversely to the axis of the shaft 13.

Stop plate 18 has adjacent slot 19 a stop ear 20 which projects outwardly from the surface of the stop plate to extend across stop disc 16. The sides of the stop ear are substantially square and when positioned at one extreme of travel along slot 19, provide a full interference for stop lug 17. The shape of the mating surfaces is such as to prevent camming out. Stop plate 18 is relatively long and narrow and extends in the direction of the slot 19. The width of slot 19 is just wide enough relative to primary shaft 13 to permit its free rotation therein. The length of the slot need not be any longer than that permitting clearance of stop ear 20 above the lug on stop disc 16.

Transverse stop plate 18, outwardly from the primary shaft and beyond the stop ear, is an arcuate coupling slot 22. This coupling slot is shaped to follow the arc of a circle concentric with the primary shaft positioned in the upper end of the slot 19, corresponding to the position of the stop plate when stop ear 20 engages lug 17.

Entered into the coupling slot is a pin 23 which couples a longitudinal control motion to the stop plate. It is clear that when the stop ear and the lug meet and the stop plate is rotated by the primary shaft, the arcuate shape of the coupling slot permits the stop plate to move without moving or harming the coupling pin 23. The arcuate slot is long enough to permit the plate to move in either direction against the bumpers.

The bumpers are composed of elastic discs 25 mounted on posts 26 which are affixed to base 10. The bumpers are positioned near the ends of the stop plate, to provide leverage in the stop plate against the motion of the primary shaft. The bumper discs may be of rubber or other soft elastic plastic.

Cam shaft 14 carries a cam 30 which is loose relative to the cam shaft and fastens to shaft 14 by means of set screws. Cam 30 has a lobe 33 which is relatively short in the circumferential dimension and has a fairly high lift. A similar cam 31 has a lobe 34 of a similar ratio to that of lobe 33 and is fastened by screw 32 to cam 30. Arcuate slot 35 permits adjustment of the position of lobe 33 over a short travel. A plurality of threaded holes in cam 30 permits several stations for screw 32 to clamp. Thus, each of the cams are adjustable over a full 360° field.

Riding on the composite cam is a follower pin 37 carried by rocker arm 38. Rocker arm 38 is mounted and pivoted on the rocker pivot 39. A spring 40 is fastened to the side plate 12 and to the opposite end of the rocker arm from the follower pin 37 to ensure the arm following the drop-off of the lobes and to provide force to pull the stop plate away from the stop disc. For refinement of the adjustment of stop ear 20 in its engagement with the lug on stop disc 16, rocker pivot 39 is mounted on an adjustable pivot plate 41. The pivot plate is secured by two screws 42 and 43 which pivot and clamp, respectively, the pivot plate relative to the side plate 12.

In operation, shaft 13 is coupled to the device for which a bi-directional multi-turn stop limit is desired. As the device turns, shaft 13 turns. This rotates stop disc 16. Simultaneously, cam shaft 14 is rotated by virtue of its coupling by gears 15 and 21.

Cam shaft 14 is rotated at a speed relative to the number of turns desired to be limited by this mechanism. That is, for two turns a gear reduction of approximately two to one is used. Observing the actions of lobe 34, it is obvious that as the follower is raised by the lobe, the stop plate is forced down to put the stop ear 20 into the path of lug 17. With the proper adjustment of lobe 34 as to its phase relative to the primary shaft, this occurs at the desired time when lug 17 approaches the stop ear 20. When lug 17 strikes stop ear 20 the stop plate is rotated against one or the other bumpers according to the direction of rotation of the primary shaft. Reversal of motion of primary shaft 13 reverses the system and as a lobe approaches the end of the second turn, the stop plate is again forced down to interfere with the travel of lug 17.

It is noted, however, that the stop ear and lug each have a finite size. As a result, the rocker arm must be actuated at a slightly earlier point in the sequence in order to compensate for the width of the stop ear and lug. Lobe 33 is then positioned relative to lobe 34 and the number of turns of the cam shaft, such that lobe 33 forces stop plate 18 down just before the arrival of the lug against the stop ear.

Where some other quantity of turns is desired to be limited, the ratio between gears 15 and 21 is adjusted accordingly. For operation where cam shaft 14 rotates several times before the desired limits are achieved, it is to be noted that the stop ear may be forced into the path of the lug but will not be effective since the timing of the stop ear's interfering presence is out of phase with the arrival of the lug in the stop ear area. Thus, the device will stop rotation of shaft 13 after a large plurality of revolutions dependent upon both the gear ratio and the adjustment of the two adjustable cams.

Although this invention has been described with respect to particular embodiments thereof, it is not to be so limited because changes and modifications may be made therein which are within the full intended scope of the invention as defined by the appended claims. For example, a single bumper may be used placed between two projections of the stop plate for eliminating rotation thereof. Further, the coupling illustrated by gears 15 and 21 may be a concentric gear system such as a planetary gear train with annular cams having lobes extending axially to drive the stop plate axially instead of transversely into the lug 17.

We claim:

1. A side plate rotatably supporting a pair of coupled shafts, a cam mounted on the first of said shafts, a rocker arm rotatably supported on said side plate with one end engageable with the cam, a first stopping means attached to said second shaft, and a stopping plate pivotably attached to the other end of said rocker arm, said stopping plate including a second stop means engageable with the first stop means.

2. A side plate rotatably supporting a pair of parallelly disposed shafts coupled by gears, an adjustable cam mounted on the first of said shafts, a rocker arm rotatably supported on said side plate with one end engageable with the cam, a first stopping means attached to said second shaft, and a stopping plate, a slot in said stopping plate receiving said second shaft, said slot permitting cooperative movement of said stopping plate with said rocker arm thus permitting engagement with said first stopping means.

3. A side plate rotatably supporting a pair of parallelly disposed shafts coupled by gears, an adjustable cam mounted on the first of said shafts, a rocker arm rotatably supported on said side plate with one end engageable with the cam, a first stopping means attached to said second shaft, and a stopping plate, a slot in said stopping plate receiving said second shaft, said slot permitting cooperative movement of said stopping plate with said rocker arm thus permitting engagement with said first stopping means, a second arcuate slot in said stopping plate receiving one end of said rocker arm, elastic bumpers disposed on each side of said stopping plate for yieldably stopping the rotation of said shafts.

References Cited in the file of this patent

UNITED STATES PATENTS

| | | |
|---|---|---|
| 1,356,419 | Winkler | Oct. 19, 1920 |
| 2,305,123 | Williams | Dec. 15, 1942 |
| 2,479,555 | Burbage | Aug. 23, 1949 |
| 2,494,486 | Peterson | Jan. 10, 1950 |
| 2,495,917 | Miner | Jan. 31, 1950 |
| 2,530,795 | Unk | Nov. 21, 1950 |
| 2,546,980 | Collins | Apr. 3, 1951 |
| 2,574,604 | La Rue | Nov. 13, 1951 |
| 2,716,896 | Beldt et al. | Sept. 6, 1955 |
| 2,731,837 | Felt et al. | Jan. 24, 1956 |